United States Patent Office 3,294,843
Patented Dec. 27, 1966

3,294,843
HYDROGENATION OF DIPHENALDEHYDE
Mary J. Farquhar, McKeesport, Pa., assignor to Koppers Company, Inc., a corporation of Delaware
No Drawing. Filed Mar. 8, 1963, Ser. No. 263,724
5 Claims. (Cl. 260—599)

This invention relates to the low temperature hydrogenation of diphenaldehyde. In one specific aspect it relates to a catalytic method of making 2'-hydroxymethyl-2-biphenylcarboxaldehyde. In another specific aspect, it relates to a catalytic method of making 2,2'-biphenyldimethanol.

Heretofore it has been reported in the literature that 2,2'-biphenyldimethanol was prepared using a reducing agent. Hall et al., J. Chem. Soc. 1950, 711, described a reaction between the dimethyl ester of diphenic acid dissolved in dry ether with a solution of lithium aluminum hydride in ether, as illustrated by the equation:

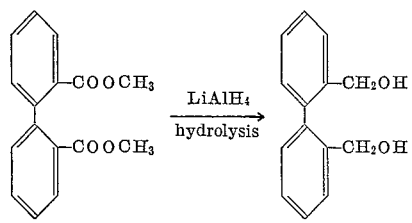

Lithium aluminum hydride has many uses, especially in reactions requiring a vigorous reducing agent. However in preparing 2,2'-biphenyldimethanol, the use of lithium aluminum hydride is unattractive because of the cost of the reagent and solvents, coupled with the fact that expensive safety precautions are required in using the reagents in large scale operations to avoid the dangerous, extremely violent reaction which occurs between lithium aluminum hydride and water or similar substances.

Further, it has been reported in the literature by Moriconi et al., J. Org. Chem. 22, 1651 (1957), that when diphenaldehyde was reduced with sodium amalgam the product recovered was 9,10-dihydrophenanthrenediol as illustrated by the equation:

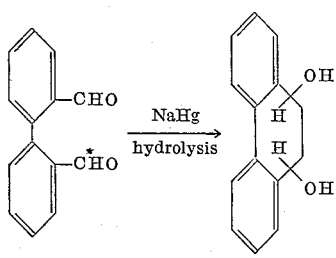

Thus it has been shown that sodium amalgam is not useful as a reducing agent to prepare the compounds of my invention.

The preparation of 2'-hydroxymethyl-2-biphenylcarboxaldehyde from diphenaldehyde requires extremely mild reducing conditions. Heretofore, this compound has been unknown and no method of preparing it has been described in the literature. The reaction of Hall et al. (loc. cit.) using lithium aluminum hydride is much too vigorous to react only one of the aldehyde groups selectively.

I have discovered a novel method for converting diphenaldehyde to either 2'-hydroxymethyl-2-biphenylcarboxaldehyde or to 2,2'-biphenyldimethanol by catalytic hydrogenation.

It is therefore an object of the present invention to provide a catalytic method of making 2'-hydroxymethyl-2-biphenylcarboxaldehyde.

It is another object of the present invention to provide a catalytic method of making 2,2'-biphenyldimethanol.

In accordance with my invention, I have discovered a method of making 2'-hydroxymethyl-2-biphenylcarboxaldehyde by reacting in an inert solvent diphenaldehyde with one mole of hydrogen per mole of diphenaldehyde in the presence of a low temperature hydrogenation catalyst selected from the group consisting of platinum, palladium and nickel at a temperature of 20–100° C. and a pressure of up to 35 p.s.i.g. In a further embodiment my invention involves making 2,2'-biphenyldimethanol by reacting in an inert solvent, diphenaldehyde with two moles of hydrogen per mole of diphenaldehyde in the presence of the low temperature hydrogenation catalyst set forth above, at a temperature of 20–100° C. and a pressure of 35–400 p.s.i.g.

Diphenaldehyde, 2,2'-biphenyldicarboxaldehyde, may be readily prepared from phenanthrene as described by Sturrock et al., U.S. Patent 2,942,030. By this inexpensive method, the diphenaldehyde has become available for commercial use. The purity of the diphenaldehyde affects the reaction temperature and yield, i.e., the purer the diphenaldehyde, the lower is the reaction temperature and the better are the yields. A convenient method of determining the purity is by melting point determination: high purity diphenaldehyde melts at 63–65° C.; impure diphenaldehyde melts at 59–61° C. When using impure diphenaldehyde, more satisfactory results are obtained by adding sodium carbonate in an amount at least sufficient to neutralize any acids which are present as an impurity.

The hydrogenation catalyst used in the present invention must be active at low temperatures and capable of reducing either one or both aldehyde groups. Useful hydrogenation catalysts include the metallic (reduced) nickel catalysts, e.g., Raney nickel; and metallic (reduced) nickel supported on an inert carrier such as kieselguhr, fuller's earth, kaolin, activated carbon, silica gel, alumina and silica-alumina. Other useful catalysts are the nobel metal catalysts, e.g., platinum and palladium. The catalyst is employed in an amount ranging between about 1–30 percent metal based on the weight of the diphenaldehyde.

The temperature under which the present reaction is run is between room temperature, i.e., about 20° C., up to about 100° C. When the temperature is below 20° C. the reaction rate is too slow to be effective. On the other hand, when the temperature is raised above about 100° C. the formation of resinous material occurs.

The pressure is significant in determining the extent of hydrogenation. Since the reaction occurs under hydrogen pressure, it is necessary that at least the stoichiometric amount of hydrogen be present for the hydrogenation, i.e., one mole for the formation of the 2'-hydroxymethyl-2-biphenylcarboxaldehyde and two moles for the formation of 2,2'-biphenyldimethanol. To prepare 2' - hydroxymethyl - 2 - biphenylcarboxaldehyde by adding one mole of hydrogen per mole of diphenaldehyde requires a pressure up to about 35 p.s.i.g. At higher pressures of about 35–400 p.s.i.g. two moles of hydrogen per mole of diphenaldehyde are added to give 2,2'-diphenyldimethanol.

The solvents used in accordance with my invention are organic solvents which are inert to the hydrogenation reaction. Useful solvents include lower alkanols, e.g., methanol, ethanol; ethers, e.g., methyl ethyl ether, diethyl ether, and dioxane; cycloaliphatic hydrocarbons, e.g., cyclohexane and decalin; aromatic hydrocarbons, e.g., benzene, xylene, toluene and chlorobenzene; and acetic acid.

Operating under the conditions of my invention, the mole ratio of hydrogen reacting with diphenaldehyde determines the nature of the final product. When one mole of hydrogen per mole of diphenaldehyde is reacted, the product obtained is 2'-hydroxymethyl-2-biphenylcarboxaldehyde. This product can be reacted with an additional mole of hydrogen to prepare the 2,2'-biphenyldimethanol. Thus the 2,2'-biphenyldimethanol may be prepared stepwise. On the other hand, it is possible, according to the present invention, to react directly two moles of hydrogen per mole of diphenaldehyde to prepare the 2,2'-biphenyldimethanol.

The 2'-hydroxymethyl - 2 - biphenylcarboxaldehyde is useful in a five percent aqueous solution as a reducing agent in the tanning of leather or it can be added to polyvinyl alcohol as a crosslinking agent. The 2,2'-biphenyldimethanol, having two functional hydroxyl groups attached to a bulky aromatic nucleus, is useful in preparing a stiff, rigid polyurethane by the reaction with tolylene diisocyanate or it can be reacted with phthalic anhydride to prepare stiff, rigid polyesters.

My invention is further illustrated by the following examples.

Example I

In a 400 ml. pressure bottle placed in a shaking apparatus and calibrated to indicate 0.1 mole of hydrogen equivalent to 8 p.s.i.g. was added, 21.0 grams (0.1 mole) of pure diphenaldehyde (M.P. 63–64° C.) dissolved in 100 ml. of methanol and about 2 grams of methanol-washed Raney nickel catalyst. The reactor was flushed with hydrogen, vented and then charged with hydrogen to a pressure of 33 p.s.i.g. While at room temperature, the reaction was conducted with continuous shaking of the reactor. At the end of 40 minutes, the pressure had dropped 8.3 p.s.i.g., indicating that about one mole of hydrogen per mole of diphenaldehyde had reacted. After removal of the catalyst, the yellow methanol solution was decolorized with charcoal and concentrated to about 50 ml. The filtrate was diluted with 50 ml. water and cooled to give white crystals which were filtered, washed with water, and dried to give 14.8 grams of material (68 percent) having a melting point of 92.5–94° C. This material was recrystallized from methanol-water to yield the pure 2'-hydroxymethyl-2-biphenylcarboxaldehyde having a melting point of 93–94° C.

Elemental analysis of the product—Found: C= 79.07%, H=5.62%. Calculated for $C_{14}H_{12}O_2$: C= 79.22%, H=5.69%.

The presence of an aldehyde group was demonstrated by warming a mixture of the product and 2,4-dinitrophenylhydrazine in 2 N hydrochloric acid to form the corresponding 2,4-dinitrophenylhydrazone.

Infrared analysis confirmed that the product was 2'-hydroxymethyl-2-biphenylcarboxaldehyde. The presence of a primary alcohol (—$CH_2OH$) group in both the solid and solution states was indicated. However, the carbonyl group was present only in the solution state.

| Absorption Band, Microns | | Structural Assignment |
|---|---|---|
| Dioxane Solution | Mineral Oil Mull | |
| 3.09 medium | 3.04 strong | —OH. |
| 3.25–3.75 weak, broad. | | Alkyl groups. |
| 5.93 medium | 5.7–6.0 absent | C=O group. |
| 6.27 weak | 6.35 weak | Phenyl ring. |
| 6.40 very weak | 6.78 weak | |
| 9.5 weak | 9.53 medium | —$CH^2OH$. |
| 9.75 medium | 9.68 strong | |
| 9.89 medium | 10.76 medium | |
| 10.79 medium | | |
| 13.2 very strong | 13.05 medium | o-Disubstituted benzene. |
| | 13.27 strong | |
| | 13.44 medium | |

Since the absorption characteristic of carbonyl groups was absent in the mineral oil mull, it was postulated that the 2'-hydroxymethyl - 2 - biphenylcarboxaldehyde rearranged in the solid state to its hemi-acetal form as illustrated below:

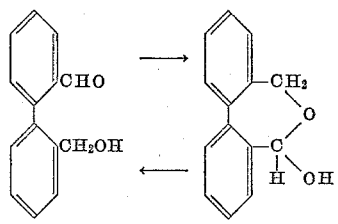

Examination by nuclear magnetic resonance techniques proved that the postulated equilibrium reaction existed and further indicated that contamination by dimeric and higher polymeric forms was present.

Example II

Following the procedure of Example I, 21.0 grams (0.1 mole) of high purity diphenaldehyde (M.P. 63–64° C.) was dissolved in 80 ml. of reagent grade methanol and the solution transferred to a 400 ml. pressure bottle. Approximately 2.0 grams of Raney nickel were added and the bottle flushed with hydrogen. The pressure was adjusted to 29 p.s.i.g. and the shaker turned on. In 18 minutes the pressure dropped 6.5 p.s.i.g. and then hydrogen absorption slowed considerably. In order to complete the addition of a total of 0.2 mole of hydrogen, the pressure was increased to 59.5 p.s.i.g. Over a period of 90 minutes the pressure dropped a further 8 p.s.i.g. The apparatus was allowed to remain at 51.5 p.s.i.g. over-night. The pressure dropped an additional 1 p.s.i.g. making a total of 15.5 p.s.i.g. absorbed (a pressure drop of 16 p.s.i.g. represents 0.2 mole of hydrogen absorbed). The catalyst was removed by filtration and the filtrate was treated with charcoal and concentrated to 50 ml. volume. After adding 50 ml. of water and cooling to room temperature, 15.2 grams of impure 2,2'-biphenyldimethanol (71 percent of theory) was recovered. Recrystallization gave pure 2,2'-biphenyldimethanol having a melting point of 112–113° C., which remained unchanged when mixed with a standard sample prepared with lithium aluminum hydride according to the method of Hall et al. (loc. cit.).

Example III

A one liter stirring autoclave was charged with 42 grams (0.2 m.) of impure diphenaldehyde (M.P. 59–61° C.) in 160 ml. of methanol and 4 grams of stabilized nickel-on-kieselguhr (65 percent by weight nickel) catalyst. After flushing with nitrogen, the autoclave was heated to a temperature of 100° C. and pressured with hydrogen to 360 p.s.i.g. When the hydrogen absorption ceased, the amount of hydrogen consumed in the reaction was determined as 0.4 mole. The catalyst was removed by filtration and the methanol was evaporated. Solids obtained were dried and crystallized from benzene. A yield of 40 percent, 2,2'-biphenyldimethanol (M.P. 111–112° C.), was obtained. The remainder was found to be a high melting resinous material.

Example IV

Following the procedure of Example III, substantially using identical reactants, with the exception that a nickel-on-kieselguhr (60 percent by weight nickel) catalyst was used, a yield of 58 percent 2,2'-biphenyldimethanol (M.P. 107–109° C.) was obtained. The remainder was found to be a high melting compound identified as trans 9,10-dihydrophenanthrenediol, having a melting point of 185–187° C., which remained unchanged when mixed with an authentic sample prepared by the lithium aluminum hydride reduction of 9,10-phenanthraquinone according to the method of Booth, Boyland, and Turner, J. Chem. Soc. 1950, 1188. Thus, it has been shown that trans-9,10-dihydrophenanthrenediol was formed from impure diphenaldehyde to which no sodium carbonate had been added (see Example V below) under the conditions of this experiment and using the stabilized catalyst.

*Example V*

The procedure of Example IV was followed, substantially using identical reactants, with the exceptions that 1 gram of sodium carbonate was added to the autoclave and the reaction was run at a temperature of 60–70° C. and at a pressure of 380–400 p.s.i.g. of hydrogen. A yield of 75 percent 2,2'-biphenyldimethanol (M.P. 111–112° C.) was obtained with no high melting material. This experiment shows that when using impure diphenaldehyde, the addition of sodium carbonate provides substantially improved yields.

*Example VI*

The procedure of Example IV was followed substantially, with the exception that pure diphenaldehyde (M.P. 63–64° C.) was used and the reaction run at a temperature of 70–78° C. and at a pressure of 380 p.s.i.g. of hydrogen. A yield of 87 percent 2,2'-biphenyldimethanol (M.P. 109–111° C.) was obtained with no high melting material.

When the reaction set forth above was run in the presence of one-half the amount of catalyst (2 grams) a yield of 88 percent 2,2'-biphenyldimethanol (M.P. 108–110° C.) was obtained with no high melting material.

I claim:

1. A method of making 2'-hydroxymethyl-2-biphenylcarboxyaldehyde comprising reacting in an inert solvent diphenaldehyde with one mole of hydrogen per mole of diphenaldehyde in the presence of a catalytic amount of a hydrogenation catalyst selected from the group consisting of platinum, palladium and nickel at a temperature of 20–100° C. and a pressure of up to 35 p.s.i.g.

2. A method according to claim 1, wherein the hydrogenation catalyst is Raney nickel.

3. A method according to claim 1, wherein the hydrogenation catalyst is nickel supported on an inert carrier.

4. A method of making 2'-hydroxymethyl-2-biphenylcarboxyaldehyde comprising reacting diphenaldehyde dissolved in methanol with one mole of hydrogen per mole of diphenaldehyde in the presence of a catalytic amount of Raney nickel catalyst at a temperature of 20–50° C. and a pressure of up to 35 p.s.i.g.

5. 2'-hydroxymethyl-2-biphenylcarboxaldehyde.

References Cited by the Examiner

UNITED STATES PATENTS

| | | | |
|---|---|---|---|
| 2,857,434 | 10/1958 | Patton | 260—599 |
| 2,902,516 | 9/1959 | White | 260—599 |
| 2,915,562 | 12/1959 | Mador et al. | 260—618 |
| 3,106,587 | 10/1963 | Harms | 260—618 |

LEON ZITVER, *Primary Examiner.*

J. J. SETELIK, R. LILES, *Assistant Examiners.*